Jan. 11, 1949.  C. D. PETERSON ET AL  2,459,094
TRANSMISSION MECHANISM

Original Filed Aug. 7, 1943  2 Sheets-Sheet 1

INVENTORS.
Carl D. Peterson
BY Albert H. Drimel
Bodell & Thompson
ATTORNEYS.

Jan. 11, 1949.　　　C. D. PETERSON ET AL　　　2,459,094
TRANSMISSION MECHANISM
Original Filed Aug. 7, 1943　　　2 Sheets-Sheet 2

INVENTORS.
Carl D. Peterson
BY Albert H. Weimer
Bodell & Thompson
ATTORNEYS.

Patented Jan. 11, 1949

2,459,094

UNITED STATES PATENT OFFICE 2,459,094

TRANSMISSION MECHANISM

Carl D. Peterson and Albert H. Deimel, Toledo, Ohio, assignors to Dana Corporation, Toledo, Ohio, a corporation of Virginia Original application August 7, 1943, Serial No. 497,839. Divided and this application November 6, 1945, Serial No. 626,942

4 Claims. (Cl. 74—368)

This invention relates to transmission mechanism of the type described in our pending application, Serial Number 497,839, filed August 7, 1943 (Patent Number 2,397,883, issued April 2, 1946), of which this application is a division.

The invention has for its object a low speed or reduction gearing in a transmission mechanism which embodies inner and outer concentric drive shafts, a driven shaft alined therewith, and clutches operable to alternately connect the drive shafts to the driven shafts, which low speed reduction gearing is actuated by the slower running drive shaft and transmits its motion to the driven shaft through an over-running clutch which permits the driven shaft to be actuated at the higher speeds when the driven shaft is clutched to either of the drive shafts. The outer drive shaft is usually actuated by the engine through a torque converter or something having a slip action and controlled by an engine clutch, and the inner drive shaft being in direct drive with the engine, and hence run at higher speed than the outer drive shaft.

The invention consists in the novel features and in the combinations and constructions hereinafter set forth claimed.

In describing this invention, reference is had to the accompanying drawings, in which like characters designate corresponding parts in all the views.

Figure 1:
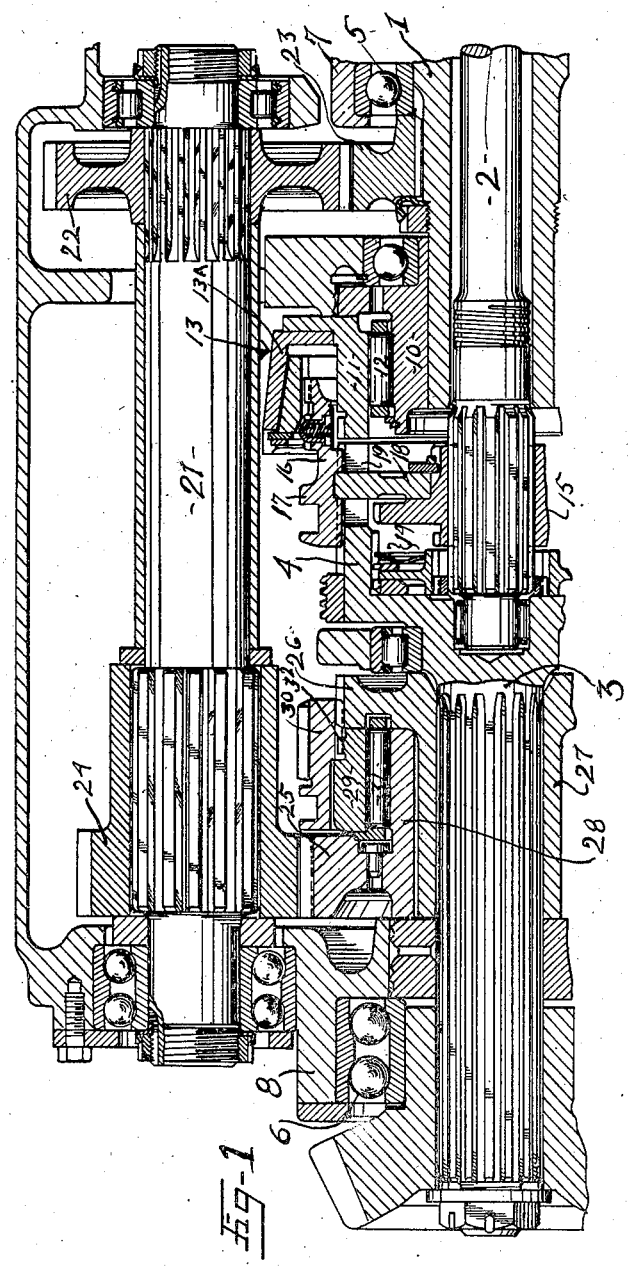
Figure 1 is a longitudinal fragmentary sectional view of the transmission mechanism showing the indirect, low or first speed drive for the driven shaft.
Figure 2:
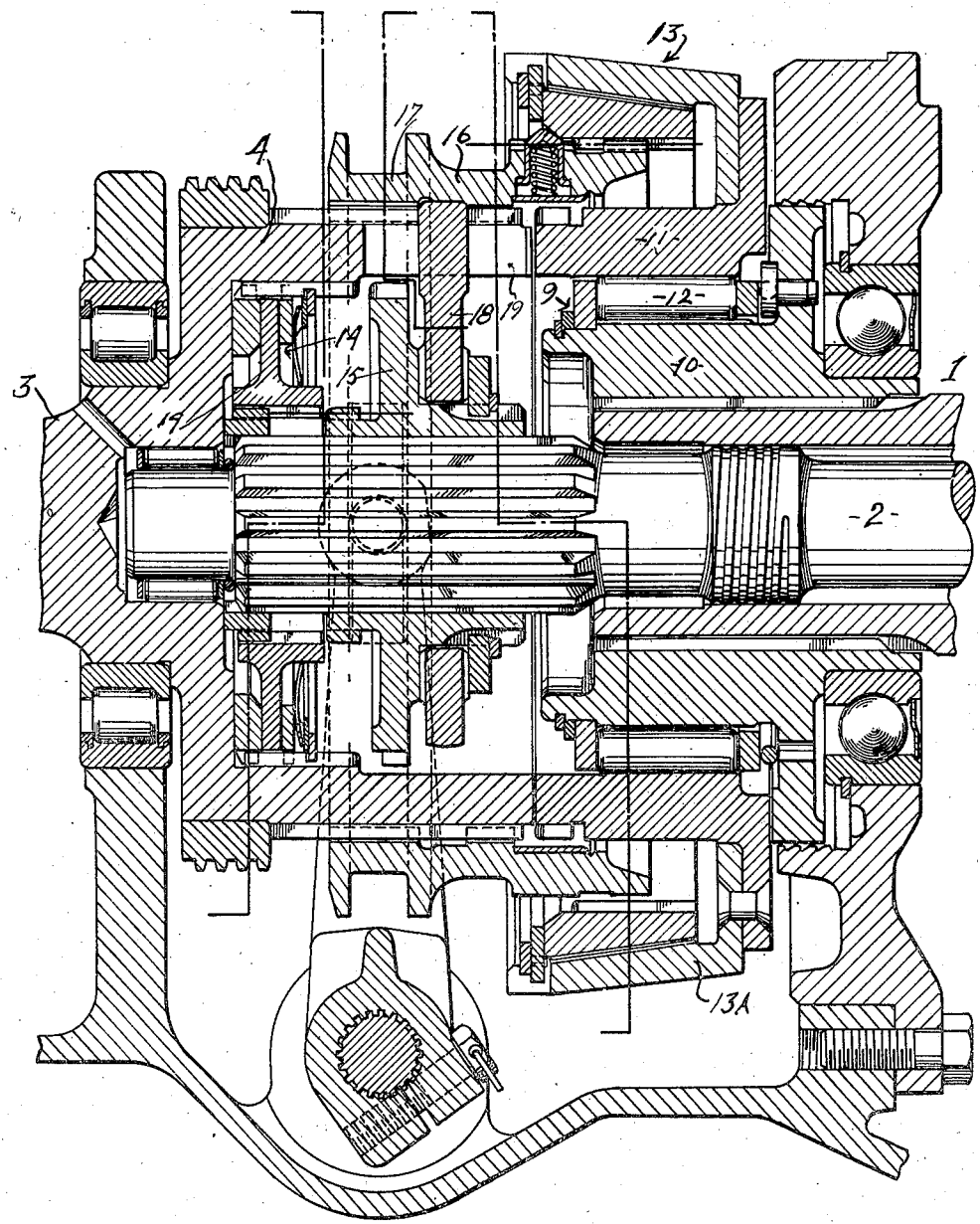
Figure 2 is an enlarged longitudinal sectional view through the clutch mechanism and contiguous parts for alternately connecting the two drive shafts and the driven shaft.

1 and 2 designate outer and inner concentric drive shafts, the outer drive shaft being usually the output shaft of a hydraulic torque converter, the impeller of which is actuated by an engine and the inner shaft being actuated directly from the engine, all as in our pending application referred to.

3 designates the driven shaft axially alined with the concentric shafts 1, 2 and spaced axially therefrom, it having a cylindrical head 4 enclosing a space between the drive shafts and the driven shaft. The concentric shafts are journalled in suitable bearings 5, 6 in walls 7, 8 of a gear casing. As the drives from the outer shaft 1 are intermediate drives, the driven shaft 3 or the head 4 thereof is driven through an overrunning clutch designated generally 9, which permits the shaft 2 to overrun the shaft 1. The overrunning clutch includes an inner race or cam 10 mounted on and rotatable with the outer shaft, an outer race 11 and rollers 12 between them. The intermediate drives are effected through a clutch as a synchronizing clutch designated generally by the reference numeral 13, the driven section 13A of which is rotatable with the outer race 11 and the driven section of which is rotatable with the head 4, as will be hereinafter explained. The direct drive from the drive shaft 2 is effected through a clutch, as a balking clutch designated generally 14, having a shiftable section 15. In so far as this invention is concerned, clutches 13 and 14 may be of any suitable construction.

16 designates the shiftable section of the synchronizing clutch 13, this being splined on the periphery of the head 4 and formed with a shifting collar 17. This collar is connected to a shiftable section 15 of the balking ring clutch through a spider 18 interlocked in a groove in a hub of section 15 and having radial arms extending through slots 19 in the head 4 and suitably interlocked with the shifting collar 17. Shifting of the clutch collar 17 to the right engages the synchronizing clutch 13, and in the opposite direction shifts the section 15 of the balking ring clutch into engagement. During movement of the shifting collar 17 to the right, the shiftable balking ring clutch section 15 merely slides idly. For a full description of these clutches see our application Serial Number 504,231, filed September 29, 1943, now Patent No. 2,399,568, dated April 30, 1946, and Patent Number 2,363,746 issued November 28, 1944, and also application Serial Number 504,232, filed September 29, 1943 (Patent Number 2,394,099, issued February 5, 1946).

Briefly, the synchronizing clutch is shown as of the cone friction type, the inner cone of which initially slides as a unit with the shifting collar 16 and then releases therefrom, and permits the collar 16 to continue its shifting to bring the clutch teeth on the collar 16 into engagement with the clutch teeth on the outer race 11. The shifting collar 16 transfers its shifting in movement to the internal cone member of the friction clutch through spring pressed poppets which yield to free the collar 16 from the cone member when the shifting in movement of the cone member is limited by its engagement with the outer complemental cone member of the synchronizing clutch, all as specifically described in the patents referred to.

The present invention lies in the indirect, first or low drive gearing between the outer drive shaft 1 and the driven shafts 3 primarily to produce low speed forward, and comprises a countershaft 21 suitably journalled in the casing parallel to the axes of the drive shafts 1, 2 and the driven shaft 3, and extending across the head 4 and the clutches therein, a gear 22 mounted on one end of the shaft 21 and meshing with a gear 23 on the outer drive shaft 2, a gear 24 on the other end of the countershaft 21 and meshing with the gear 25 concentric with the driven shaft 3, a clutch gear 26 splined on the driven shaft 3 in the rear of and adjacent the head 4 and having an elongated hub 27 on which the hub 28 of the gear 25 is rotatably mounted, and clutch means between the gear 25 and the clutch gear 26 here shown as including an overrunning clutch between the hub 28, and an outer race 29, and a clutch collar 30 coacting with the outer race 29 and the clutch gear 26. The hub 28 constitutes the inner race or cam of the overrunning clutch and 29 is the outer race. 31 designates the rollers between these two raceways. The clutch collar 30 has internal splines which normally engage external teeth 32 on the outer race 29 and the peripheral teeth of the clutch gear 26. This clutch collar 30 is shiftable so as to interlock exclusively and engage with the clutch gear 26, and it is shifted in any suitable manner. The clutch gear 30 is provided with external gear teeth which mesh with a reverse spool, not shown, when the clutch collar 30 is shifted into exclusive engagement with the clutch gear 26.

Owing to the overrunning clutch including the rollers 31, the driven shaft 3 can overrun the indirect or low drive when the shaft 2 is being driven to a higher gear ratio from the shafts 1 or 2. Thus, in all forward speeds, the clutch collar 30 is in the position shown in Figure 1.

In operation, with the clutch collar 17 in neutral position, the drive will be from the outer drive shaft 1 which is driven from the engine shaft through the hydraulic converter, through gears 23, 22, 24, 28, the overrunning clutch including rollers 31, to the collar 30, and thence to the driven shaft 2. Upon the shifting of the clutch collar 17 to the right, the drive is through the synchronizing clutch 13. Shifting of the clutch collar 17 to the left from neutral, shifts in the balking clutch section 15, thus connecting the shaft 2 directly to the shaft 3. The clutches are controlled in any suitable manner, as in the parent application referred to.

What we claim is:

1. In a transmission mechanism, inner and outer concentric drive shafts, a driven shaft axially alined therewith, clutch means operable to connect either of the drive shafts to the driven shaft, and indirect drive means between the outer drive shaft and the driven shaft including an overrunning clutch permitting the driven shaft to overrun the indirect drive when the inner drive shaft is connected to the driven shaft to drive the same.

2. In a transmission mechanism, inner and outer concentric drive shafts, a driven shaft axially alined therewith, a clutch operable in one direction from neutral to connect the outer drive shaft to the driven shaft and in the other direction from neutral to clutch the inner drive shaft to the driven shaft, and an indirect reduction drive gearing between the outer drive shaft and the driven shaft including an overrunning clutch to permit the driven shaft to overrun the indirect drive when the inner shaft is clutched to the driven shaft.

3. In a transmission mechanism, inner and outer concentric drive shafts, a driven shaft axially alined therewith, a clutch operable in one direction from neutral to connect the outer driving shaft to the driven shaft and in the other direction from neutral to clutch the inner drive shaft directly to the driven shaft, clutch sections on the outer drive shaft and the driven shaft for coacting with said shiftable clutch, an overrunning clutch between the outer drive shaft and said drive clutch section, indirect reduction drive gearing between the outer drive shaft and the driven shaft including an overrunning clutch permitting the driven shaft to overrun the indirect drive when the driven shaft is clutched to the inner drive shaft, the first overrunning clutch permitting the driven shaft to overrun the outer drive shaft when driven at a higher speed by the inner drive shaft.

4. In a transmission mechanism, inner and outer concentric drive shafts, a driven shaft axially alined therewith and spaced therefrom and having a hollow cylindrical head, the inner drive shaft extending into the head beyond the end of the outer drive shaft, a clutch operable to connect the inner drive shaft to said head including a shiftable section mounted on the drive shaft within the head, a clutch operable to connect the head to the outer drive shaft including a drive section actuated by the outer drive shaft, a shiftable section on said head and having a shift collar shiftable in opposite directions from neutral, the shiftable clutch section within the head being connected to the shift collar to shift therewith, the shiftable sections in and on the head being shiftable alternately into their engaged positions in opposite directions from neutral, an overrunning clutch between the outer drive shaft and the drive section of the clutch actuated thereby by the outer drive shaft, for permitting the inner drive shaft to overrun the outer drive shaft, indirect reduction gearing between the outer drive shaft and the driven shaft including an overrunning clutch, permitting the driven shaft to overrun the indirect drive shaft, the latter overrunning clutch being located concentric with the driven shaft adjacent the head on the driven shaft.

CARL D. PETERSON.
ALBERT H. DEIMEL.

REFERENCES CITED

The following references are of record in the file of this patent:

UNITED STATES PATENTS

| Number | Name | Date |
| --- | --- | --- |
| 2,355,709 | Dodge | Aug. 15, 1944 |